Sept. 8, 1936.　　　　　A. HILL　　　　　2,053,611
COMBINED PRESSURE REDUCING AND SHUT-OFF VALVE
Filed June 29, 1931　　　2 Sheets-Sheet 2

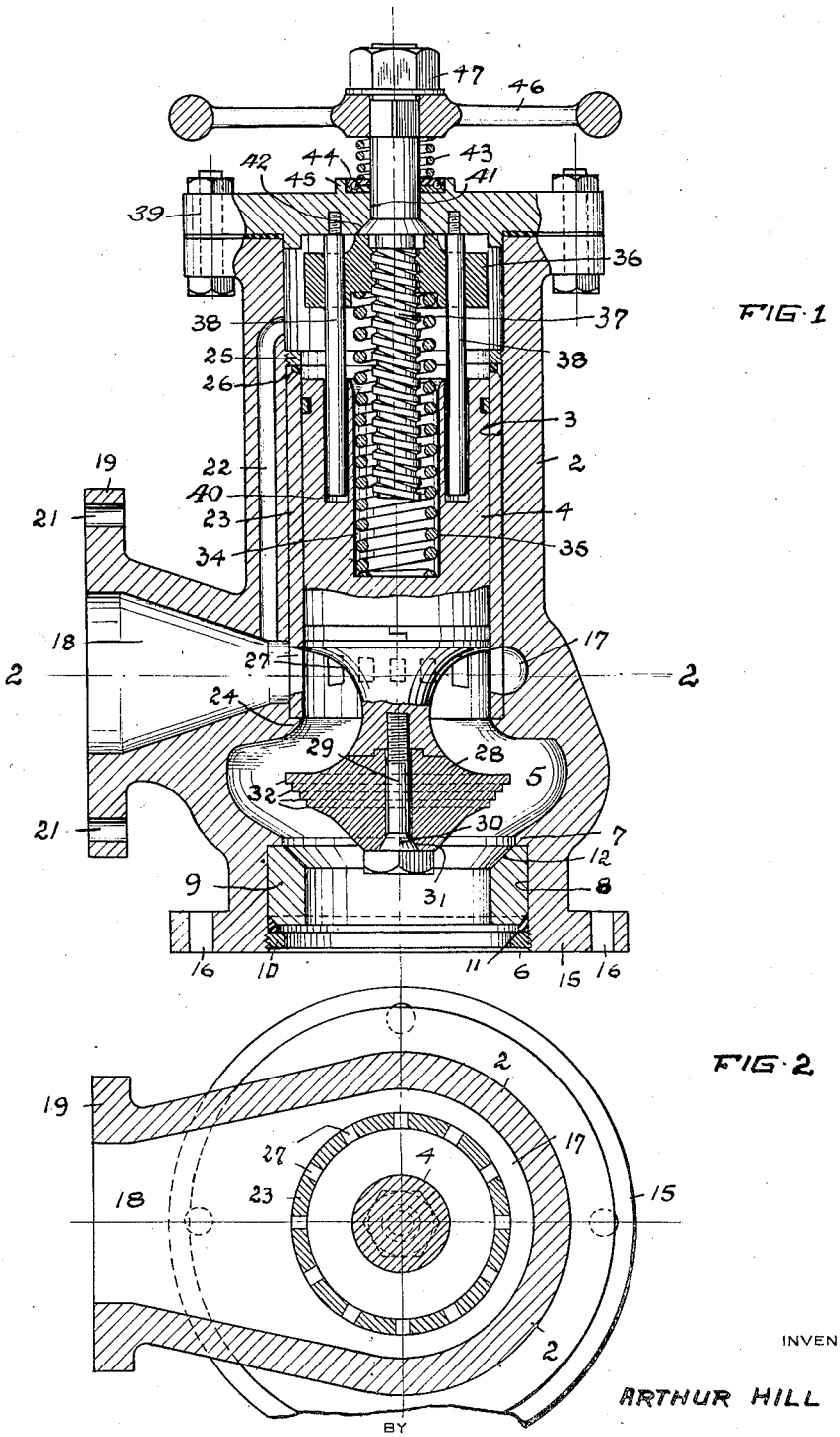

INVENTOR
ARTHUR HILL
BY
*Gustav A. Wolff*
ATTORNEY

Patented Sept. 8, 1936

2,053,611

UNITED STATES PATENT OFFICE 2,053,611

COMBINED PRESSURE REDUCING AND SHUT-OFF VALVE

Arthur Hill, Cleveland, Ohio

Application June 29, 1931, Serial No. 547,624

2 Claims. (Cl. 50—8)

The present invention relates to valves in general and more particularly to automatic pressure reducing valves to control the amount of pressure between a high pressure supply source (steam, gas, air or water) and a number of low pressure working units (tanks, hydraulic and air operated tools, etc.) connected therewith and fed thereby.

The general object of the invention is to provide an automatic pressure reducing valve, which may serve as a shut off valve if so desired by positively and forcibly shifting the controlling means into a shut-off position so that the flow of a fluid through the valve is entirely cut off.

A further object of the invention is to provide a reducing valve unit as delineated above having additional valve means, coupled with said automatically shiftable controlling means and forming a distinct and individual shut-off, and co-operating with said shiftable controlling means in shut-off proceedings, thereby preventing any leakage of the valve, when fully closed.

These additional valve means are inactive and inoperative when the valve is set to control and reduce the pressure of a fluid passing through the valve, and therefore cannot in such position of the valve shut off or decrease the flow of fluid through the valve.

A further object of the invention is to provide a combined reducing and shut-off valve of simple and sturdy construction, having its passage controlled by a shiftable piston, one end face of which is openly exposed to the full pressure at the inlet side of the valve and the other end of which is exposed to the reduced pressure at the outlet side of the valve. A second valve is mounted on the face of the piston exposed to the pressure side of the valve, which in turn seats within the inlet passage of said valve in axial alignment with the shiftable piston.

Figure 3:
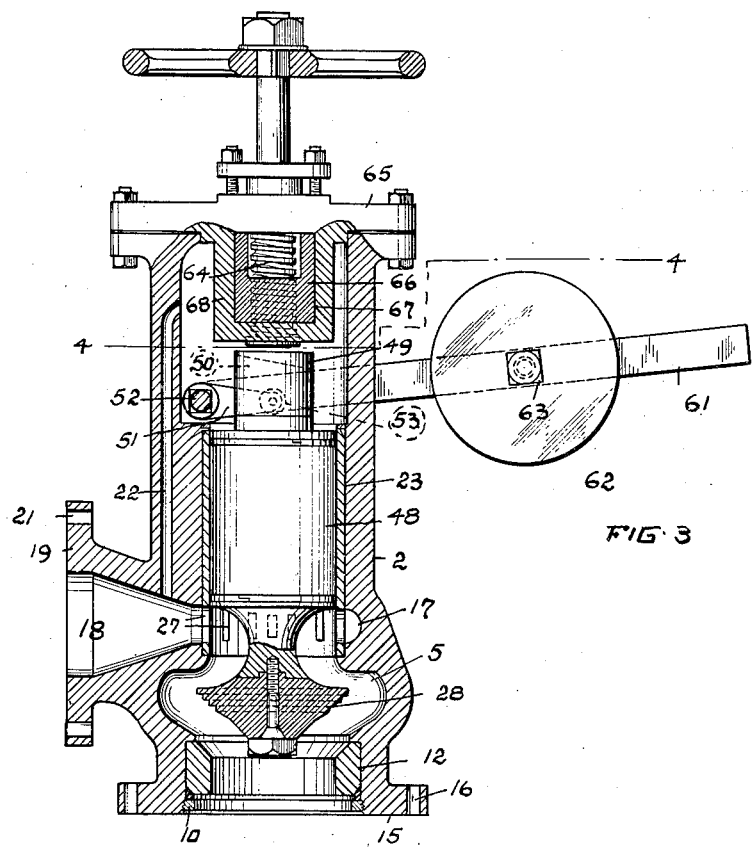
Figure 4:
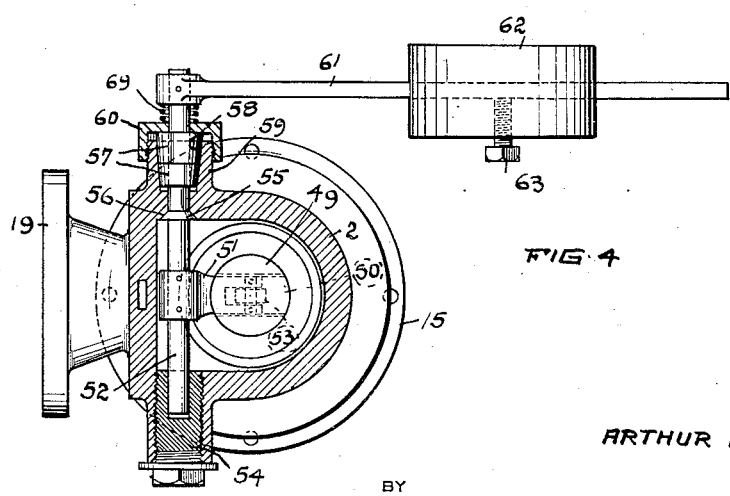

Still further objects of the invention will more readily appear from the following detailed description when taken in connection with the accompanying drawings forming a part of the specification and as more concisely pointed out in the appended claims. In the drawings, Fig. 1 is a central vertical sectional view through an adjustable automatic reducing and cut-off valve embodying the invention. Fig. 2 is a sectional view on the line 2—2 of Fig. 1. Fig. 3 is a central vertical sectional view through an adjustable automatic reducing and cut-off valve of a somewhat modified form compared to Fig. 1, showing a lever and weight arrangement for setting the valve to the desired pressure. Fig. 4 is a sectional view on line 4—4 of Fig. 3.

In the drawings, where similar characters refer to similar parts throughout the views, the housing or main body 2, preferably a casting, is hollow to provide a cylindrical chamber 3 for a vertically shiftable piston 4. Chamber 3 extends into an enlarged chamber 5 axially aligned with chamber 3 and communicates with inlet passage 6, an offset or shoulder portion 7 being provided between chamber 5 and inlet passage 6. The smooth portion 8 of inlet passage 6 seats a ring shaped seating member 9, preferably made of bronze and held in fluid tight connection with body 2 against shoulder portion 7 by a ring shaped nut 10 and sealing ring 11. The inner end 12 of member 9 is designed to form a cone-shaped recess or valve seat. Body 2 is circularly flanged at 15 around inlet passage 6, and bolt openings 16 serve to attach the body to a pipe or other connection if so desired.

The inside wall of chamber 2 is circularly recessed and forms a channel 17 close to its intersecting line with chamber 5, which channel communicates with outlet 18 in flanged extension 19, provided with bolt openings 21 to connect the outlet of the valve to a pipe. Channel 17 also communicates by means of a by-pass 22 with the upper part of chamber 2 just above a cylinder sleeve 23, which sleeve rests upon a shoulder 24 in chamber and is held in proper position by a ring nut 25 and a sealing ring 26. The lower end of the sleeve 23 is slotted to permit of communication of the chamber 5 with the outlet 18. Thus a plurality of elongated and differentially sized slots 27 are circularly arranged in the lower end of the sleeve 23 and these slots are related with respect to the shiftable piston 4 so that a downward movement of the said piston first decreases the open area of said slots and finally closes all of these slots. The piston 4 supports at its lower end a valve member 28, which member is preferably made of fiber and attached to said piston by means of a screw bolt 29. This bolt includes a conical enlargement 30, which seats in a conical recess 31 of the valve member 28 and centers same with respect to the piston 4. The valve member 28 is formed with a plurality of circular shoulder portions 32 to provide a plurality of sealing line contacts between the valve 28 and its seat 12. The valve member 28 is seated upon its seat, when the piston 4 has fully closed the slots 27.

The upper portion of the piston 4 carries a compression spring 35, which spring rests in a recessed portion 34 of said piston. This spring is backed by a nut member 36, screw-engaged with a rotatable screw member 37. The nut member 36 is shiftably arranged with respect to the screw member 37 and is guided in a pair of guide rods 38, threadedly connected with a cover member 39 for the body 2. The rods 38 extend with their free ends into circular recesses or drills in the piston 4 for guiding same and the screw member 38 extends upwardly and outwardly through a central opening 41 in the cover 39. The lower edge of this opening is conically shaped and seats a conical enlargement 42 on the screw member 37, which member is yieldingly forced upwardly by a compression spring 43, seated upon a ball bearing, which bearing is mounted in a boss 45 of the cover member 39. The upper end of the spring 43 engages a hand wheel 46 attached to the upper end of the screw member by means of a nut 47.

In operation the nut member 36 is adjusted to proper position by rotating the screw member 37 so that the member 35 yieldingly forces the piston 4 downwardly. A fluid pressure at the intake side of the valve will then force the piston 4 upwardly and therewith expose the slots 27, so that fluid can pass through the valve. When the slots 27 are opened the pressure at the intake side of the valve is automatically reduced and therefore the spring 35 will now force the piston 4 downwardly until the pressure at the lower face of the piston and the pressure of the spring are equalized. During the action just described a back pressure is built up at the outlet 18, which back pressure is transmitted to the upper face of the piston through the by-pass 22. Consequently a further downward movement of the piston takes place until the desired pressure reduction between the inlet and the outlet of the valve is established.

In case the valve is to be fully closed, then the handle 46 is rotated to shift the nut 36 downwardly until the piston 4 fully closes the slots 27 and seats the valve member 28 upon its seat 12. The structure described above discloses an adjustable spring member to permit of the reducing valve being adjusted to any desired pressure reduction, however other means than a spring may be used for the same purpose. Thus the modified form of the invention, shown in Figs. 3 and 4 discloses a reducing valve having a weight and lever arrangement for presetting the valve to the desired pressure reduction. In this construction the piston 48 embodies a cylindrical extension 49, which is slotted at 50 and guides a yoke-shaped arm 51, which is rigidly attached to a rotatable shaft 52. This arm carries at its yoke-shaped end a roller 53 in rolling engagement with the lower face of the slot 50. One end of the shaft 52 is pivotally mounted in a bearing 54 while the other end of said shaft is formed with a cone-shaped enlargement 55 seated in a cone-shaped recess 56 of the casing 2. The shaft 52 extends through a plurality of cone-shaped split bearings 57 adjustably secured in a cone-shaped bore 58 in a cylindrical extension 59 of the body or casing 2, and these bearings are held in proper position by a perforated screw cap 60, threadedly engaged with the extension 59. The shaft 52 extends through the cap 60 and is forced outwardly by means of a spring 69, resting against the cap 60 and a lever arm 61, carrying a weight 62, adjustably secured thereto by a set screw 63. When the valve is to be closed, the screw member 64, extending through a cover 65 is rotated and thereby axially shifted by means of a nut member 66. This nut member is held against longitudinal movement in a slotted boss 68, extending downwardly from the cover 65 and slotted at 67. Otherwise the structure is identical in construction and operation to the structure of Figs. 1 and 2, therefore further description is deemed unnecessary.

What I claim, is:

1. A combined pressure reducing and shut-off valve, comprising a hollow body having intake and outlet openings, a sleeve secured in said body and covering said outlet opening, a plurality of differentially sized slots circumferentially and symmetrically arranged in said sleeve with their centers in the same horizontal plane in alignment with said outlet opening, a shiftable piston openly exposed at one end to the intake and communicating at its other end with the outlet of said body, having a valved extension attached thereto for closing said inlet opening, means yieldingly shifting said piston for closing said differentially sized slots, and vertically shiftable means adapted to contact with said piston to positively shift said piston during closing operations to successively close said slots by said piston and said intake by said valved extension.

2. In a combined pressure reducing and shut-off valve a hollow body having intake and outlet openings, communicating with opposite sides of said hollow body, a slidable piston controlling said outlet openings, a valved extension at the bottom of said piston, a valve seat for said extension in said intake opening, a slotted extension at the top of said piston, a weighted lever system tending to shift said piston to close said intake and outlet openings at predetermined pressure differences between said intake and outlet openings, and vertically shiftable means independent from said lever system adapted to contact with said slotted extension of said piston to first close said outlet opening and thereafter by means of said valved extension said intake opening, said lever system including a pivotally supported lever extended into said slot and carrying a roller contacting with the bottom wall thereof and a weight supporting lever coupled with said lever.

ARTHUR HILL.